W. R. McKEEN, Jr.
ENGINE VALVE.
APPLICATION FILED JAN. 17, 1907.
940,349.
Patented Nov. 16, 1909.
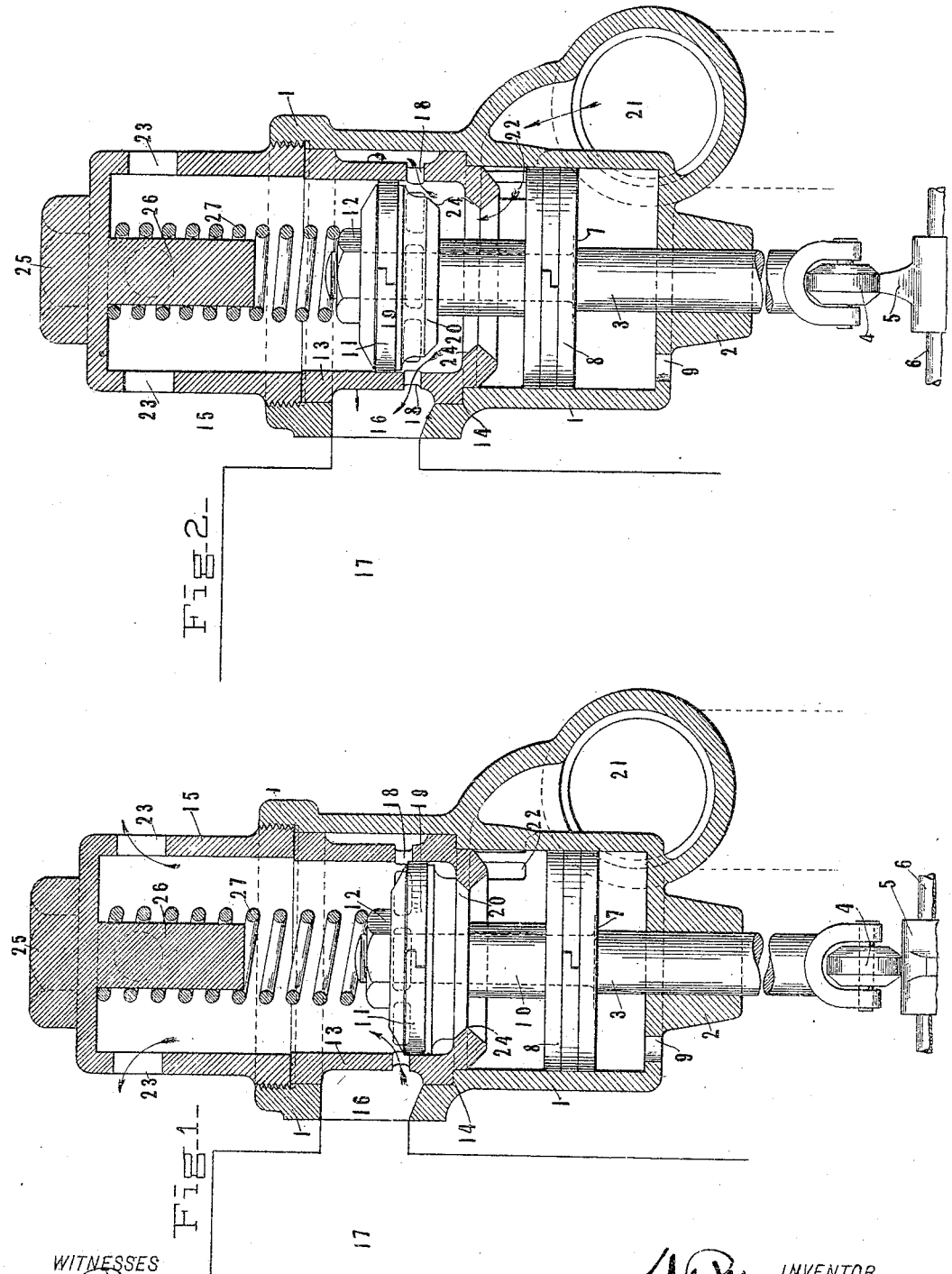

UNITED STATES PATENT OFFICE.

WILLIAM R. McKEEN, JR., OF OMAHA, NEBRASKA, ASSIGNOR TO EDWARD H. HARRIMAN, OF ARDEN, NEW YORK.

ENGINE-VALVE.

940,349.  Specification of Letters Patent.  Patented Nov. 16, 1909.

Application filed January 17, 1907. Serial No. 352,728.

*To all whom it may concern:*

Be it known that I, WILLIAM R. McKEEN, Jr., residing at Omaha, in the county of Douglas and State of Nebraska, have invented certain new and useful Improvements in Engine-Valves, of which the following is a full, clear, and exact description, such as will enable others skilled in the art to which it appertains to make and use the same.

This invention relates to valves and the like.

One of the objects thereof is to provide an efficient and practical valve, adapted for use in connection with engines, in which a large port opening is attained with a slight actuation or short path of travel of the moving parts.

Another object is to provide a device of the above type in which leakage is substantially done away with.

Another object is to provide means in connection with a piston valve whereby extensive packing or a large area of contact with the valve seat is avoided.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawing, wherein is shown one of various possible embodiments of my invention, Figure 1 is a sectional elevation thereof showing the valve in exhaust position; Fig. 2 is a similar view showing the valve at admission.

Similar reference characters refer to similar parts throughout both views of the drawing.

As conducive to a ready understanding of certain aims of this invention, it may be noted that in connection with engine valves it is highly desirable that at times both of admission and of exhaust, a full, free port opening be instantly provided and this without leakage of the compressed motive fluid.

Referring now to the accompanying drawing, there is shown at 1 a shell or casing, through the lower portion 2 of which passes a stem or piston rod 3. This stem is provided at its lower end with an antifriction roller 4 operatively related to a cam 5 upon the shaft 6.

Mounted upon stem 3 and rigidly held in position by a shoulder 7 is a piston 8 fitted within the lower cylindrical portion of the casing 1 and adapted upon being exposed to pressure upon its upper side to tend to force the stem in a downward direction, the accumulation of pressure upon its lower side being avoided as by the vent 9. Also mounted upon stem 3 and spaced from piston 8, as by sleeve 10, is a valve member 11 which is held in position by a nut 12. Valve member 11 is adapted to travel within a sleeve or valve seat 13 fitted within the casing 1 and resting upon shoulder 14, the upper end being engaged by a cap 15, the construction of which will hereinafter be described in detail. Sleeve 13 is so formed and related to the casing 1 as to provide an annular passage 16 leading to the cylinder 17, diagrammatically indicated, and this sleeve is provided with a series of ports 18 adapted to open communication from the inner side thereof to the annular passage.

Valve member 11 comprises two portions 19 and 20, the upper of which engages the inner walls of the sleeve or seat 13, and in its travel from its uppermost to its lowermost positions, respectively indicated by Figs. 2 and 1 of the drawing, opens the ports 18 to communication with a source of compressed fluid supply 21 through ports 22 and with the exhaust through ports 23 in the cap 15. The lower portion 20 of valve member 11 is adapted to coact with the inturned lower end 24 of the sleeve 13 in such manner as to form a check valve at this point with the stem in its lowermost position, as shown in Fig. 1. Cap 15 is provided upon its upper end with a nut 25 to aid in turning the same into assembled relation with the casing 1, and has upon its inner surface a depending lug or teat 26 about which is coiled a spiral spring 27, the lower end of which abuts against the nut 12 and tends to force the stem 3 in a downward direction.

The operation of the above described embodiment of my invention is substantially as follows: Assuming the valve to be raised, as by cam 5, the compressed fluid from source 21 passes through ports 22 and ports 18 to the cylinder 17. At this stage the valve is positively held in raised position, but is exposed to a powerful downwardly acting force exerted through the piston 8 by the pressure upon its upper surface and by the compressed spring 27. Upon the projection of cam 5 passing from beneath the roller 4, the stem is immediately snapped into its lowermost position, shown in Fig. 1, in which the cylinder is open to the exhaust through ports 18 and 23 and the high pressure fluid positively cut off not only by the valve portion 19, but by the lower check valve 20. This double protection against leakage of the motive fluid at this stage is peculiarly desirable inasmuch as the lower surface thereof is exposed to the full static pressure from the source of supply, which is considerably greater than that to which it is exposed during admission, by reason of the free passage of the fluid to the cylinder 17, the latter being then substantially at atmospheric pressure.

It will thus be seen that there is provided a device in which leakage is efficiently guarded against precisely at the stage at which there is the greatest tendency for it to occur, and that by reason of this disposition of parts and relation of elements the necessity for extensive packing and a large surface of contact with the valve seat is done away with. The valve, moreover, is instantly thrown into its open position by the projection of cam 5, and is snapped downwardly by piston 8 acting in conjunction with spring 27, the latter elements eliminating all chance of sticking or tardy action of the valve. The parts are of simple construction, few in number and readily assembled, and their action is of such nature as to render the entire device not only efficient, but durable and reliable in a high degree.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense. It is also to be understood that the language used in the following claims is intended to cover all of the generic and specific features of the invention herein described and all statements of the scope of the invention which, as a matter of language, might be said to fall therebetween.

Having described my invention, what I claim as new and desire to secure by Letters Patent is:—

1. In apparatus of the class described, in combination, a piston valve, a cylinder, a source of compressed fluid supply, means provided with ports co-acting with said valve adapted in one position of said valve to open said cylinder to the exhaust and in another position of said valve to open communication between said cylinder and said source of compressed fluid supply, a second valve interposed between said source of supply and said cylinder, and a single means adapted to actuate both valves.

2. In apparatus of the class described, in combination, a piston valve, a cylinder, a source of compressed fluid supply, means provided with ports co-acting with said valve adapted in one position of said valve to open said cylinder to the exhaust and in another position of said valve to open communication between said cylinder and said source of compressed fluid supply, a second valve interposed between said source of supply and said cylinder, a stem upon which both of said valves are mounted, and means adapted to reciprocate said stem and, upon said first valve occupying exhaust position, to hold said second valve against its seat.

3. In apparatus of the class described, in combination, a piston valve, means provided with ports with which said valve co-acts, a source of compressed fluid supply, means leading from said source of supply to said valve, a valve in said last-mentioned means controlling the passage therethrough, a stem upon which both of said valves are mounted, a piston upon said stem exposed to pressure from said source of supply upon one side and tending to force said stem in one direction, and means adapted intermittently to force said stem in the opposite direction.

4. In apparatus of the class described, in combination, a piston valve, a cylinder, a source of compressed fluid supply, means provided with ports leading to said cylinder and co-acting with said valve, means connecting said source of supply with said valve, a second valve interposed in said connecting means, a stem upon which both of said valves are mounted, said valves being so formed as upon said stem being moved in one direction to close said second valve and open said cylinder to the exhaust and upon said stem being moved in the other direction to open said second valve and open said cylinder to said source of supply, a piston upon said stem exposed to pressure from said source of supply upon one side and adapted to tend to force said valves into said first position, and a cam adapted intermittently to force said valves into said second position.

5. In apparatus of the class described, in combination, a piston valve, a cylinder, a source of compressed fluid supply, means provided with ports leading to said cylinder and co-acting with said valve, means connecting said source of supply with said valve, a second valve interposed in said connecting means, a stem upon which both of said valves are mounted, said valves being so formed as upon said stem being moved in one direction to close said second valve and open said cylinder to the exhaust and upon said stem being moved in the other direction to open said second valve and open the said cylinder to said source of supply, a spring operatively related to said stem and adapted to tend to force said valves into said first position, and intermittently acting means adapted to force said valves into said second position.

6. In apparatus of the class described, in combination, a piston valve, a cylinder, a source of compressed fluid supply, means provided with ports leading to said cylinder and co-acting with said valve, means connecting said source of supply with said valve, a second valve interposed in said connecting means, a stem upon which both of said valves are mounted, said valves being so formed as upon said stem being moved in one direction to close said second valve and open said cylinder to the exhaust and upon said stem being moved in the other direction to open said second valve and open the said cylinder to said source of supply, a piston upon said stem exposed upon one side to pressure from said source of supply, a spring operatively related to said stem, said spring and said piston being adapted to tend to force said valves into said first position, and a cam operatively related to said stem adapted intermittently to force said valves into said second position.

7. In apparatus of the class described, in combination, a piston valve, means provided with ports with which said valve co-acts, a source of compressed fluid supply, means leading from said source of supply to said valve, a valve in said last-mentioned means controlling the passage therethrough, a stem upon which both of said valves are mounted, a spring operatively related to said stem and adapted to tend to force the same in one direction, and means adapted intermittently to overcome said spring and force said stem in the opposite direction.

8. In apparatus of the class described, in combination, a piston valve, means provided with ports with which said valve co-acts, a source of compressed fluid supply, means leading from said source of supply to said valve, a valve in said last-mentioned means mounted to move toward and away from its seat and controlling the passage therethrough, a single means adapted to actuate both of said valves, means normally tending to force said last-mentioned means in a direction to close said second valve, and means adapted intermittently to force said means in the opposite direction.

9. In apparatus of the class described, in combination, a cylinder, a source of compressed fluid supply, a member provided with ports leading to said cylinder, a piston fitted within said member and co-acting with said ports, means connecting said source of compressed fluid supply with one side of said piston, a valve seat formed within said connecting means, a valve adapted to co-act with said valve seat and traveling with said piston, means tending to force the piston in a predetermined direction and to force said valve against the seat, and means adapted intermittently to force said parts in the opposite direction.

10. In apparatus of the class described, in combination, a cylinder, a source of compressed fluid supply, a member provided with ports leading to said cylinder, a piston fitted within said member and co-acting with said ports, means connecting said source of compressed fluid supply with one side of said piston, a valve seat formed within said connecting means, a valve adapted to co-act with said valve seat and traveling with said piston, means tending to force the piston in a predetermined direction and to force said valve against the seat, means adapted intermittently to force said parts in the opposite direction, and a casing surrounding said first member and providing therewith an annular passage about the same leading to said cylinder.

11. In apparatus of the class described, in combination, a cylinder, a source of compressed fluid supply, a member provided with ports leading to said cylinder, a piston fitted within said member and co-acting with said ports, means connecting said source of compressed fluid supply with one side of said piston, a valve seat formed within said connecting means, a valve adapted to co-act with said valve seat and traveling with said piston, a stem upon which the piston and said valve are mounted, a piston of a diameter greater than that of said first piston mounted upon said stem, means within which said second piston is fitted and to which the fluid is led from said source of supply whereby one side of said second piston is exposed to pressure therefrom, and a cam adapted intermittently to move said stem against the force of said last piston.

12. In apparatus of the class described, in combination, a valve, means provided with ports with which said valve coacts, a source of compressed fluid supply, means leading from said source of supply to said valve, a valve in said last-mentioned means controlling the passage therethrough, a single means adapted to open both of said valves, and means controlled by said compressed fluid tending to hold said valves in closed condition.

In testimony whereof I affix my signature, in the presence of two witnesses.

WILLIAM R. McKEEN, Jr.

Witnesses:
 H. R. VAN ARSDALE,
 C. W. LOUCKS.